(12) United States Patent
Tingle (10) Patent No.: US 11,554,558 B2
(45) Date of Patent: Jan. 17, 2023

(54) TOOL FOR MANUFACTURING A COMPOSITE COMPONENT

(71) Applicant: Rolls-Royce PLC, London (GB)

(72) Inventor: James Tingle, Derby (GB)

(73) Assignee: Rolls-Royce plc, London (GB)

(*) Notice: Subject to any disclaimer, the term of this patent is extended or adjusted under 35 U.S.C. 154(b) by 490 days.

(21) Appl. No.: 16/496,831

(22) PCT Filed: Mar. 22, 2018

(86) PCT No.: PCT/EP2018/057262
§ 371 (c)(1),
(2) Date: Sep. 23, 2019

(87) PCT Pub. No.: WO2018/177869
PCT Pub. Date: Oct. 4, 2018

(65) Prior Publication Data
US 2020/0316821 A1    Oct. 8, 2020

(30) Foreign Application Priority Data

Mar. 28, 2017  (GB) ..................................... 1704890

(51) Int. Cl.
B29C 70/44         (2006.01)
B29C 33/38         (2006.01)
(Continued)

(52) U.S. Cl.
CPC .......... B29C 70/44 (2013.01); B29C 33/3814 (2013.01); B29C 33/3842 (2013.01);
(Continued)

(58) Field of Classification Search
CPC . B29C 33/3814; B29C 33/3842; B29C 70/44; B29C 70/541; B29L 2031/082
(Continued)

(56) References Cited

U.S. PATENT DOCUMENTS

| 4,902,215 A | 2/1990 | Seemann, III |
| 8,052,831 B2 | 11/2011 | Polus et al. |

(Continued)

FOREIGN PATENT DOCUMENTS

| DE | 19813105 A1 | 9/1999 |
| EP | 1413421 A1 | 4/2004 |

(Continued)

OTHER PUBLICATIONS

"International Application No. PCT/EP2018/057262, International Search Report and Written Opinion dated Oct. 7, 2018", (Oct. 7, 2018), 10 pgs.

(Continued)

*Primary Examiner* — Jeffrey M Wollschlager
*Assistant Examiner* — Xue H Liu
(74) *Attorney, Agent, or Firm* — Schwegman Lundberg & Woessner, P.A.

(57) ABSTRACT

There is disclosed a tool for manufacturing a composite component, the tool comprising: a skin composed of fibre reinforced plastic and defining a layup surface for the composite component, the skin having a plurality of passageways extending from the layup surface to an opposing surface of the skin; a backing secured to the skin, the backing and the skin defining a cavity therebetween; a support core disposed within the cavity and comprising a gas-permeable material in fluid communication with the passageways; and a conduit extending through the backing such that the conduit is in fluid communication with the gas-permeable material.

20 Claims, 5 Drawing Sheets

(51) Int. Cl.
 B29C 70/54 (2006.01)
 B29L 31/08 (2006.01)

(52) U.S. Cl.
 CPC .......... B29C 70/54 (2013.01); B29C 70/541 (2013.01); *B29L 2031/082* (2013.01)

(58) Field of Classification Search
 USPC ...................................................... 425/405.2
 See application file for complete search history.

(56) References Cited

U.S. PATENT DOCUMENTS

| | | | |
|---|---|---|---|
| 2006/0172111 A1* | 8/2006 | Polus .................... | B29C 70/545 428/116 |
| 2009/0120567 A1 | 5/2009 | Yamada et al. | |
| 2009/0252921 A1 | 10/2009 | Bottler et al. | |
| 2011/0175262 A1 | 7/2011 | Kiyomi et al. | |
| 2012/0119405 A1 | 5/2012 | Weber et al. | |
| 2014/0260858 A1* | 9/2014 | Johnson ................ | B29C 70/388 83/156 |
| 2019/0118411 A1* | 4/2019 | Marengo ................ | B29C 70/44 |

FOREIGN PATENT DOCUMENTS

| | | |
|---|---|---|
| EP | 1413421 | 8/2007 |
| EP | 2184150 A1 | 5/2010 |
| JP | H08150624 | 6/1996 |
| JP | 2008528240 | 7/2008 |
| JP | 2011110749 | 6/2011 |
| JP | 2012528024 | 11/2012 |
| WO | 2011129385 | 10/2011 |
| WO | WO-2018177869 A1 | 10/2018 |

OTHER PUBLICATIONS

"United Kingdom Application GB1704890.1, Search Report dated Jun. 30, 2017", (Jun. 30, 2017), 4 pgs.
"Japanese Application Serial No. 2019-553078, Final Office Action dated Nov. 30, 2021", w/ English Translation, 6 pgs.
"Chinese Application Serial No. 2018800229869, Office Action dated Apr. 1, 2021", w/ English Translation, 16 pgs.
"Japanese Application Serial No. 2019-553078, Notification of Reasons for Refusal dated Aug. 31, 2021", w/ English Translation, 5 pgs.

* cited by examiner

TOOL FOR MANUFACTURING A COMPOSITE COMPONENT

PRIORITY CLAIM TO RELATED APPLICATIONS

This application is a U.S. national stage filing under 35 U.S.C. § 371 from International Application No. PCT/EP2018/057262, filed on 22 Mar. 2018, and published as WO2018/177869 on 4 Oct. 2018, which claims the benefit under 35 U.S.C. 119 to United Kingdom Application No. GB1704890.1, filed on 28 Mar. 2017, the benefit of priority, of each of which is claimed herein, and which applications and publication are hereby incorporated herein by reference in their entirety.

FIELD OF THE INVENTION

The invention relates to a tool for manufacturing a composite component and a method of making the tool.

BACKGROUND

Composite components are increasingly used in advanced industries, such as the aerospace industry, owing to the ability to combine desirable material properties, such as high strength and low weight.

Composite components are typically formed by laying up plies of fibre reinforcement material on a tool or mandrel to provide a pre-form for the component, and subsequently forming and curing the pre-form under temperature and/or pressure to produce the component.

It is known to compress a pre-form on a tool, for example, during a curing procedure. A pre-form may be compressed in a closed-moulding tool, or by applying a vacuum bag over the pre-form and coupling a low pressure or vacuum apparatus so that there is a pressure force acting on the pre-form through the bag.

It is desirable to provide an improved tool for manufacturing a composite component.

SUMMARY

According to a first aspect of the invention there is provided a tool for manufacturing a composite component, the tool comprising: a skin composed of fibre reinforced plastic and defining a layup surface for the composite component, the skin having a plurality of passageways extending from the layup surface to an opposing surface of the skin; a backing secured to the skin, the backing and the skin defining a cavity therebetween; a support core disposed within the cavity and comprising a gas-permeable material in fluid communication with the passageways; a conduit extending through the backing such that the conduit is in fluid communication with the gas-permeable material.

The support core may include a barrier layer disposed between the gas-permeable material and the backing. The barrier layer may be configured to prevent matrix material (e.g. resin) flowing into the gas-permeable membrane from the backing when the backing is laid up and/or cured. The barrier layer may comprise a release liner. The barrier layer may be non-perforated.

The support core may include a port in fluid communication with the gas-permeable membrane between the gas-permeable membrane and the backing, and the port may be in fluid communication with the conduit.

The tool may further comprise a low pressure or vacuum apparatus fluidically coupled to the conduit.

The backing may be integrally formed with the skin. The backing may be integrally formed with the skin by being at least partly laid-up directly onto the skin such that they are bonded together. The backing may be integrally formed with the skin by laying up the skin and backing and curing them together. Alternatively, the backing may be adhesively bonded or otherwise fastened to the skin.

At least a portion of the backing may be directly coupled to the skin. For example, the backing may be bonded onto the skin by laying up the backing directly onto margin portions of the skin, which may be pre-cured. Alternatively, there may be an adhesive between the backing and the skin.

There may be a plurality of cavities between the skin and the backing, and there may be a plurality of discrete support cores disposed in the respective cavities. There may be a plurality of discrete backings, each backing associated with a respective one of the cavities.

The tool may further comprise a controller configured to selectively fluidically coupling respective cavities or subsets of cavities to the low pressure or vacuum apparatus.

According to a second aspect of the invention there is provided a tool assembly comprising a support structure and one or more tools according to any preceding claim mounted to the support structure. The tool assembly may comprise a controller configured to selectively fluidically couple respective cavities or subsets of cavities of the tool or tools to a low pressure or vacuum apparatus for the tool assembly. The tool assembly may further comprise the low pressure or vacuum apparatus.

The tool assembly may be in the form of a mandrel. A plurality of tools of the assembly may form a substantially continuous layup surface around the mandrel.

A tool according to the first aspect of the invention or a tool assembly according to the second aspect of the invention may further comprise vacuum bagging apparatus for applying over a pre-form for a composite component.

According to a third aspect of the invention there is provided a method of manufacturing a tool for laying up a composite component, the method comprising: applying fibre reinforcement material on a master to form a skin of the tool; applying a support core including a layer of gas-permeable material over the skin; applying fibre reinforcement material over the support core to form a backing of the tool so that the skin and the backing define a cavity therebetween in which the support core is disposed; causing the fibre reinforcement material of at least the backing to cure under compression so that the cavity conforms to the support core.

The skin may have a layup surface for the composite component. The master may be known as a master tool. The fibre reinforcement material may be caused to cure under compression so that the shape of the cavity conforms to the shape of the support core. The backing and/or the support core may deform during curing under compression. The skin may deform during curing under compression.

The fibre reinforcement material may be cured under compression so that there is a substantially continuous interface between the wall or walls of the cavity (at least the wall defined by the skin) and the support core, such that in use the skin of the tool cannot be deflected without corresponding deflection or deformation of the support core. In other words, the support core may support the skin of the tool to prevent the skin collapsing or deforming. The support core may act as a load bearing body between the backing and the skin, and there may be a substantially continuous load bearing interface between the support core and the cavity walls. In other words, there may be no gaps between at least the cavity wall defined by the skin and the support core. There may be no gaps between the cavity wall defined by the backing and the support core.

Applying the support core may include applying a barrier layer over the gas-permeable material, such that the barrier layer is disposed between the gas-permeable material and the backing. Applying the support core may include applying a port over the gas-permeable material for drawing gas through the gas-permeable material, wherein the port is configured for fluid communication with a conduit extending through the backing in use. The port may be integrally formed within the conduit.

Where a barrier layer is applied, the barrier layer may be applied over the gas-permeable material and at least partially over the port. The barrier layer may be applied so as to leave an opening for the conduit. Alternatively, an opening for the conduit may subsequently be formed in the barrier layer after it has been applied. The backing may be formed by applying fibre reinforcement material over the support core and around the conduit.

The method may further comprise forming a plurality of passageways through the skin to provide fluid communication between the cavity and an opposing surface of the skin. Where the skin defines a layup surface for laying up a composite component, the opposing surface with respect to the cavity may comprise the layup surface.

The method may further comprise curing the fibre reinforcement material forming the skin before curing the fibre reinforcement material of the back and/or before applying the support core over the skin. The passageways through the skin may be formed after curing the fibre reinforcement material forming the skin and before curing the fibre reinforcement material of the backing and/or before applying the support core over the skin.

The method may further comprise fluidically coupling the port to a low pressure or vacuum apparatus.

The fibre reinforcement material for the backing may be applied so that at least a portion of the backing is applied directly onto the skin.

The fibre reinforcement material may be applied to form a plurality of cavities between the skin and the backing, and a plurality of discrete support cores may be applied over the skin corresponding to the plurality of cavities. Fibre reinforcement material may be applied over each support core to form a plurality of discrete backings, each backing associated with a respective one of the cavities.

The method may further comprise mounting the tool on a support structure to form a tool assembly. The tool may be one of a plurality of tools mounted on the support structure to form the tool assembly. The tool assembly may be in the form of a mandrel.

The method may further comprise providing a controller for selectively fluidically coupling respective cavities or subsets of cavities to the low pressure or vacuum apparatus.

BRIEF DESCRIPTION OF THE DRAWINGS

The invention will now be described, by way of example, with reference to the accompanying drawings, in which.

DETAILED DESCRIPTION

Figure 1:
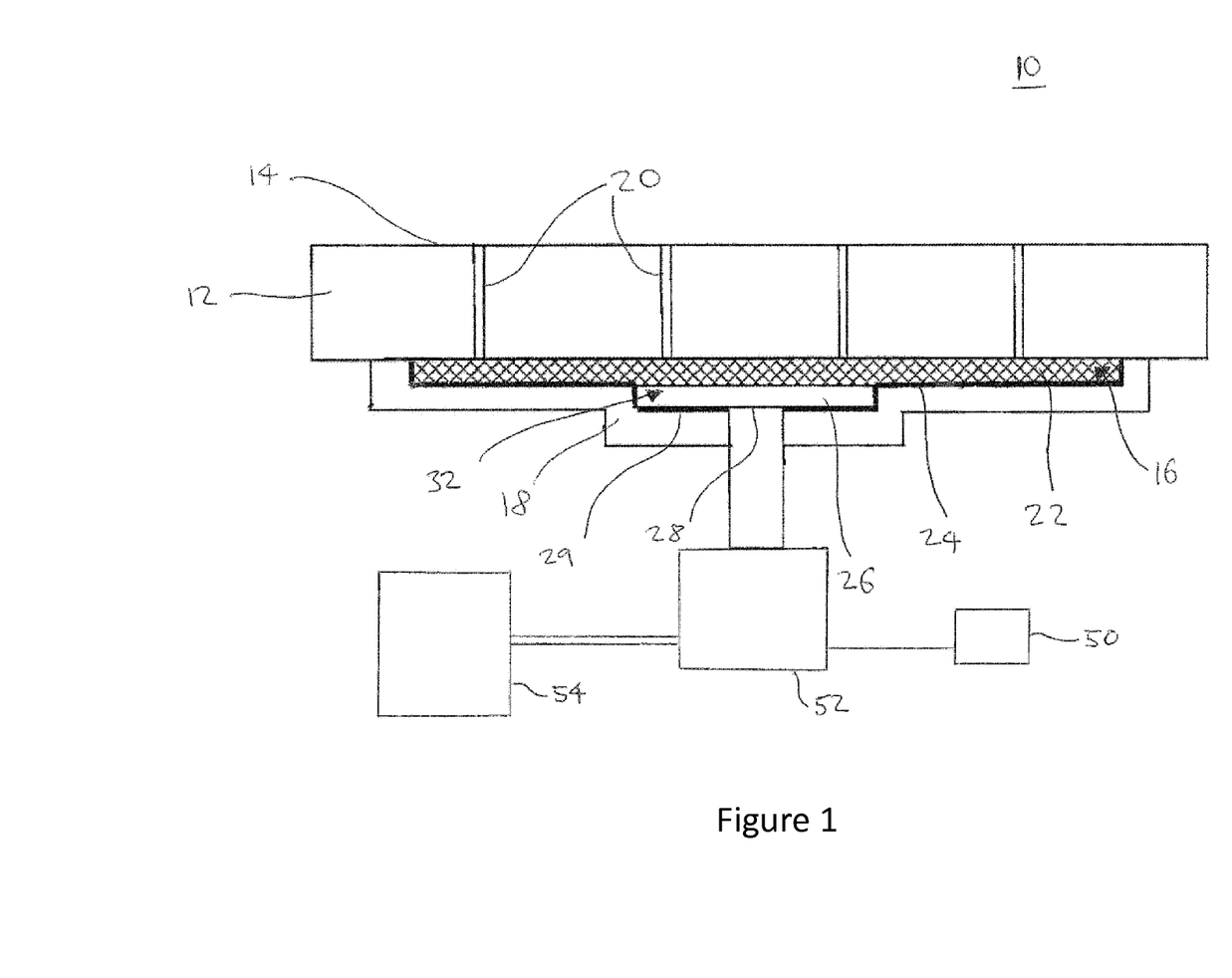
FIG. 1 schematically shows a cross-sectional view of a tool for manufacturing a composite component.

FIG. 1 shows a tool 10 for a composite component comprising a skin 12, support core 16 and backing 18. In this embodiment, the tool 10 is for forming a composite fan blade for a gas turbine engine.

The skin 12 defines a layup surface 14 on an exposed side of the tool 10 for laying up fibre reinforcement material to form the composite component. In this embodiment, the layup surface 14 is substantially planar, but in other embodiments the layup surface may be of any suitable shape for forming a component, for example, with concave and convex regions.

The skin 12 is perforated with a plurality of suction passageways 20 which extend through the skin 12 from the layup surface to an obverse side of the skin adjacent the support core 16. In this embodiment, the passageways are approximately 1.5 mm thick. This is sufficient for applying suction to retain a release sheet on the layup surface 14 (as will be described below), without causing the release sheet to be deflected into the passageways 20. The passageways 20 are spaced apart over the layup surface 14 at a pitch of approximately 25 mm in a 2D grid (i.e. distributed in rows and columns).

In this embodiment the skin 12 is approximately 8 mm thick and the layup surface 14 has dimensions of approximately 1,250 mm by 750 mm (not shown). The skin 12 is composed of fibre-reinforced plastic, and is manufactured as described in detail below.

The support core 16 lies below the skin 12 on the opposite side to the layup surface 14 so that the support core 16 is in fluid communication with the passageways 20. The support core 16 is enclosed in a cavity defined by the skin 12 and the backing 18.

In this embodiment, the support core 16 comprises a gas-permeable layer 22, a barrier layer 24 and a port 26.

The gas-permeable layer 22 comprises a crush-resistant material having a mesh or cellular structure. Suitable materials include those routinely used for resin infusion, in which resin is applied onto an infusion mesh over a fibre-reinforcement pre-form to distribute the resin equally over the surface of the pre-form. In this particular embodiment, the gas-permeable layer 22 is composed of a non-woven plastic material, such as LDPE (low density polyethylene) formed in a diamond pattern mesh. In this example, the gas-permeable layer 22 is approximately 3 mm thick, but in other embodiments may have a lower thickness, such as 1 mm or 0.5 mm. The gas-permeable layer 22 is sized such that it can be placed against each of the passageways 20 and leave a margin around the underside of the skin 12 (i.e. the obverse side with respect to the layup surface 14). In other words, the gas-permeable layer has a smaller planar extent than the skin 12 (i.e. in the longitudinal and lateral directions of the skin (not shown)) such that there is a margin around the underside of the skin 12 for coupling with the backing 18. In this embodiment, the gas-permeable layer has longitudinal and lateral dimensions of 1200 mm and 700 mm respectively.

The compressive strength of the gas-permeable layer 22 may be greater than the compressive strength of the backing 18, such that in use when a low pressure or vacuum is applied to the conduit 30 so that a compression force is applied through the skin 12 and backing 18, the gas-permeable layer 22 is able to resist compression by deflection of the backing 18 and/or the skin 12. Further, the backing 18 may be thinner than the skin 12 so that it is more flexible than the skin 12. Consequently, in the unlikely event of an excessive compressive load, the backing 18 may deflect in preference to the skin 12, so that the profile of the lay-up surface of the skin 12 is not deflected. When the compressive strength of the gas-permeable layer 22 is greater than that required to deflect the backing 18 (i.e. the compressive strength of the backing 18), any deflection of the backing 18 towards the skin 12 may be resisted by the gas-permeable layer 22 to prevent the holes 20 becoming blocked. The compressive strength of the gas-permeable layer 22 may be sufficient to resist deflection under normal operational compressive loads when a low pressure or vacuum source is coupled to the conduit 30, such as compressive loads corresponding to a pressure difference of 1 atmosphere.

The port 26 is provided within the support core 16 against the underside surface of the gas-permeable layer 22 (i.e. between the gas-permeable layer 22 and the backing 18). In this embodiment, the port is a squat substantially cylindrical duct having a wide mouth adjacent the gas-permeable layer and a relatively narrow opposing opening 28 in a rear wall 29 for communicating with a conduit 30 that extends through the backing 18 (as described below). In this embodiment, the port 26 has an external diameter of approximately 40 mm, but any diameter sufficient to establish fluid communication with a plurality of interstices (i.e. spaces) in the gas-permeable layer 22 will suffice. The port 26 in combination with the gas-permeable layer 22 enables fluid communication between each one of the passageways 20 and the conduit 30, such that gas can be drawn through the passageways 20 by application of a low pressure or vacuum apparatus 54 to the conduit 30, as will be described in detail below.

The barrier layer 24 is disposed over the undersides of the gas-permeable layer 22 (i.e. the obverse side of the gas-permeable layer 22 with respect to the side facing the skin 12) and of the port 26, such that no portion of the barrier layer 24 lies between the gas-permeable layer and the port 26. The barrier layer 24 also extends around the side faces of the support core 16 to form a barrier between the gas-permeable layer 22 and the backing 18. The barrier layer 24 is formed of a non-porous (e.g. non-perforated) sheet material such as a polymer film, such as a fluoropolymer film. Materials commonly used as release liners may be suitable for use as a barrier layer.

The backing 18 is composed of fibre reinforced plastic formed over the support core 16 so that edge regions of the backing 18 lie against a margin region of the underside of the skin 12 (i.e. where there is no support core 16). Accordingly, the backing 18 and skin 12 define a cavity 32 for the support core 16 in which the support core 16 is enveloped.

The skin 12 and backing 18 are configured so that there is a continuous, load-bearing interface between the support core 16 and the walls of the cavity 32. Accordingly, loads applied to the skin 12 are transmitted and resisted through the support core 16 and backing 18. Aside from the interstitial gaps in the gas-permeable layer 22 and any gaps within the cylindrical boundary of the port 26, there are substantially no gaps between the walls of the cavity (i.e. the inner walls of the skin 12 and backing 18) and the support core 16. Accordingly, it is not possible to deform or deflect the skin 12 without corresponding deformation or deflection of the support core 16 and backing 18. In particular, the compressive strength of the support core 16 is sufficiently high that the compressive strength of the tool 10 as a whole is greater than if the support core 16 were removed. Further, as there are substantially no gaps between the skin 12 and the support core 16, in use the skin 12 is not able to deflect into such gaps unsupported by the support core 16. In contrast, the skin 12 is supported by the support core 16, acting between the backing 18 and skin 12, so as to resist the compressive load and any corresponding deflection.

A conduit 30 extends from the opening 28 in the rear side of the port 26 through the backing 18 and can be coupled to a low pressure or vacuum apparatus 54, such as a gas pump or vacuum pump, so as to draw gas through the passageways 20, gas-permeable layer 22, port 26 and conduit 30.

The tool 10 may be coupled to or may be provided with an integrated low pressure or vacuum apparatus, and/or a controller for controlling fluid communication between the port 26 and the low pressure or vacuum apparatus. In this particular embodiment, the conduit is coupled to a vacuum apparatus 54 via a control valve 52, and the controller 50 operates to fluidically couple and de-couple the conduit 30 (and so the port 26 etc.) with the vacuum apparatus 54.

Figure 2:
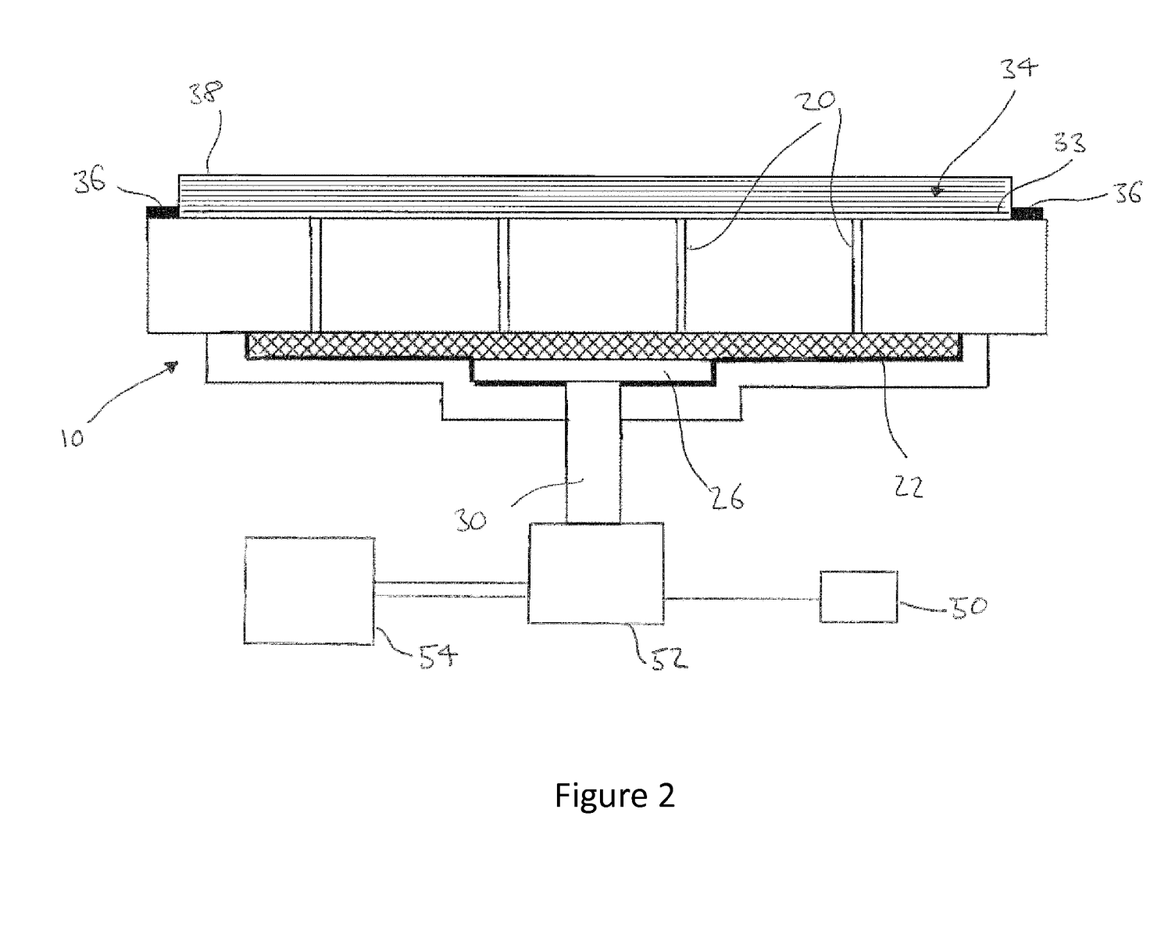
FIG. 2 schematically shows the tool of FIG. 1 in use.

A layup procedure using the tool 10 will now be described, by way of example, with reference to FIG. 2. The tool 10 is provided for the layup procedure and is prepared by placing a release sheet 33 over the lay-up surface 14 of the skin 12, which in this example is non-perforated. The release sheet 33 is held against the tool 10 when the controller 50 opens the control valve 52 to cause the port 26 to be in fluid communication with the low pressure or vacuum apparatus 54, such that gas is drawn through the passageways 20, gas-permeable layer 22, port 26 and conduit 30. The passageways 20 are sized appropriately so that the pressure difference over the release sheet 33 is sufficient to hold it firmly against the tool 10, but the release sheet 33 is not drawn into the passageways 20 themselves, which could deform the surface of the release sheet 33.

A pre-form 34 for the component is then laid up on the tool 10 by applying pre-preg fibre reinforcement material onto the release sheet 33. Any suitable layup equipment may be used, but in this particular example an applicator head (not shown) is driven to apply fibre-reinforcement material by Automatic Fibre Placement (AFP).

After layup, sealant tape 36 is applied to the layup surface 14 around the pre-form 34 and a vacuum bag (or membrane) 38 is applied over the pre-form 34 and sealant tape 36 to enclose the pre-form 34 between the tool 10, vacuum bag 38 and pre-form 34. In other embodiments, the tool 10 may be provided with integrated vacuum bagging apparatus.

Subsequently, the controller causes a low pressure or vacuum to be applied to the pre-form, for example through one or port in the vacuum bag 38, or through auxiliary passageways in the skin (not shown) having openings that are not overlaid by the release sheet 33. Such auxiliary passageways may extend through the skin and be coupled to a low pressure or vacuum apparatus, which may be the same or a different low pressure or vacuum apparatus as is coupled to the conduit 30. Similarly, a low pressure or vacuum apparatus may be coupled to one or ports in the vacuum bag 38 for applying a low pressure or vacuum therethrough, and this may be the same or a different low pressure or vacuum apparatus as is coupled to the conduit 30. This results in a pressure difference corresponding to the difference between ambient pressure (e.g. atmospheric) and the low pressure or vacuum pressure acting on the pre-form 34. The tool may also be heated, either directly (e.g. by heating elements coupled to the backing 18) or indirectly (e.g. in an oven or autoclave). The combined temperature and pressure causes the pre-form 34 to undergo a de-bulking operation in which small gaps between the fibre reinforcement material and matrix material are removed.

Once de-bulk is complete, the vacuum bag 38 is removed and the de-bulked component is removed from the tool 10. In this embodiment, the de-bulked component is cured in a separate procedure. The release sheet 33 has non-stick properties which make it easy to withdraw the de-bulked component from the release sheet 33, and which prevents the resin from the component bonding with the layup surface 14. The component may therefore be removed without the use of removal tools or the application of forces that may cause the component to deform.

Figure 3:
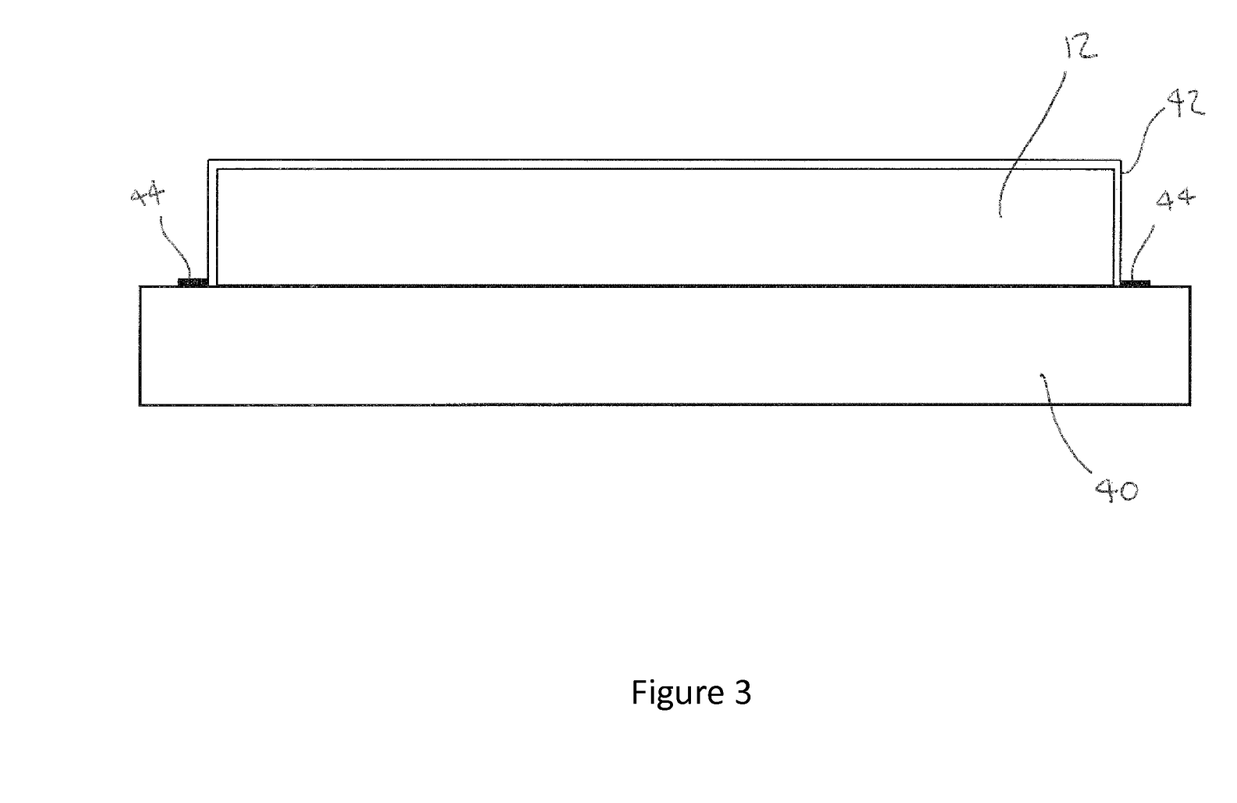
FIG. 3 schematically shows a skin of the tool of FIG. 1 during manufacture.

A method of manufacturing the tool 10 will now be described, by way of example, with reference to FIG. 3. As shown in FIG. 3, a master tool 40 is provided for manufacturing the tool 10. In this embodiment, the master tool 40 is composed of aluminium and defines a layup surface corresponding to the layup surface 14 of the skin 12. Fibre reinforcement material is applied to the master tool 40 to form a pre-form for the skin 12. Subsequently, the skin 12 is cured on the master tool 40 by applying a vacuum bagging apparatus including a vacuum bag 42 and sealant tape 44 to the master tool, and subjecting the skin 12 to elevated temperature and, optionally pressure. In this embodiment, the vacuum bag for curing the skin 12 is provided with ports for coupling to a low pressure or vacuum apparatus (not shown), but in other embodiments the master tool 40 may be provided with a perforated layup surface and the vacuum or low pressure apparatus may be coupled through the master tool in a similar manner as described above.

Figure 4:
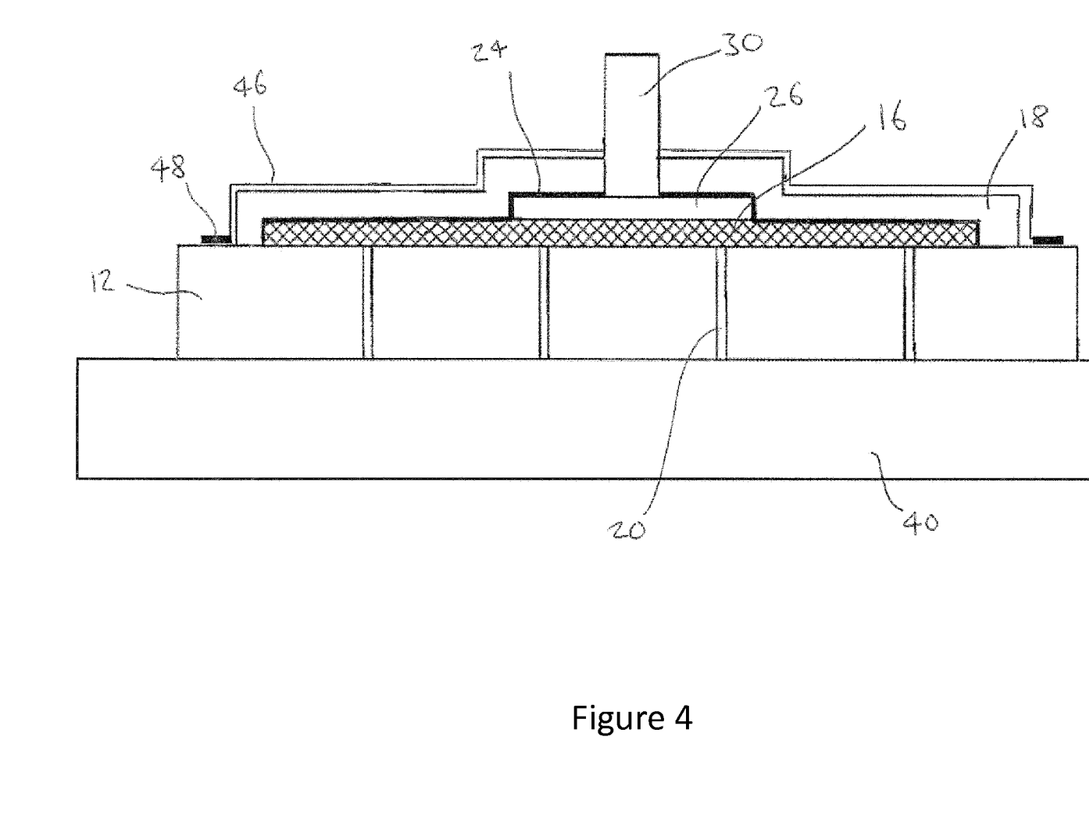
FIG. 4 schematically shows the tool of FIG. 1 during manufacture.

Once cured, the skin 12 is removed from the master and the passageways 20 are formed in the skin 12 by drilling to form a matrix of 1.5 mm holes at a pitch of 25 mm. As shown in FIG. 4, the skin 12 is then placed back onto the tool master and the support core 16 is applied over the underside surface of the skin 12 (i.e. the obverse side with respect to the layup surface 14). The gas-permeable layer 22 is placed over the skin 12. Subsequently, the port 26 with integrated conduit 30 is placed over the gas-permeable layer 22 such that the wide mouth of the port 26 is adjacent the gas-permeable layer 22. The barrier layer 24 is applied over the underside surfaces of the gas-permeable layer 22 and the port 26 and around the conduit 30. Finally, fibre reinforcement material is applied over the skin 12 and barrier layer 24 (and around the conduit 30) to form the backing 18. The support core 16 is sized to leave a margin portion of the underside surface of the skin 12 over which the fibre reinforcement material for the backing 18 is partially laid, thereby enabling a direct structural connection between the backing 18 and skin 12 (once cured).

Sealing tape 48 and a vacuum bag 46 are applied onto the margin portion of the skin 12 and over the backing 18, and a vacuum or low pressure apparatus is coupled to ports of the bag to subject the tool 10 to a compression force against the master tool 40. Further, the fibre reinforcement material 18 is heated (e.g. using a radiative heater, such as an infrared heater disposed over the tool 10) to an elevated temperature. Accordingly, the fibre reinforcement material for the backing 18 is compressed and cured against the support core 16 and the skin 12.

In other embodiments, the fibre reinforcement material for the backing 18 may be heated directly, for example, by conduction through an integrated heater of the master tool 40 and through the skin 12 and support core 16.

The fibre reinforcement is relatively pliant during the first stages of curing owing to the elevated temperature and compression forces. Accordingly, the backing 18 deforms and conforms to the shape of the support core 16. Further, the support core 16 may be relatively compliant such that it conforms to the shape of the skin 12. Accordingly, any gaps between the support core 16 and the walls defined by the skin 12 and backing 18 are removed during compressive curing, such that there are substantially continuous load-bearing interfaces between the support core 16 and the skin 12 and backing 18. Consequently, once the backing 18 is cured, the cavity for the support core 16 defined by the skin 12 and backing 18 is precisely fitted around the support core 16 and is therefore as is small as it can be made, such that the skin 12 is supported by the support core 16 and cannot be deflected or deformed by compression without corresponding deformation or deflection of the support core 16 and/or the backing 18. The barrier layer 24 prevents resin from the pre-preg fibre reinforcement material from migrating into the gas-permeable layer 22, which could otherwise block the interstices in the gas-permeable layer and/or the passageways 20.

Figure 5:
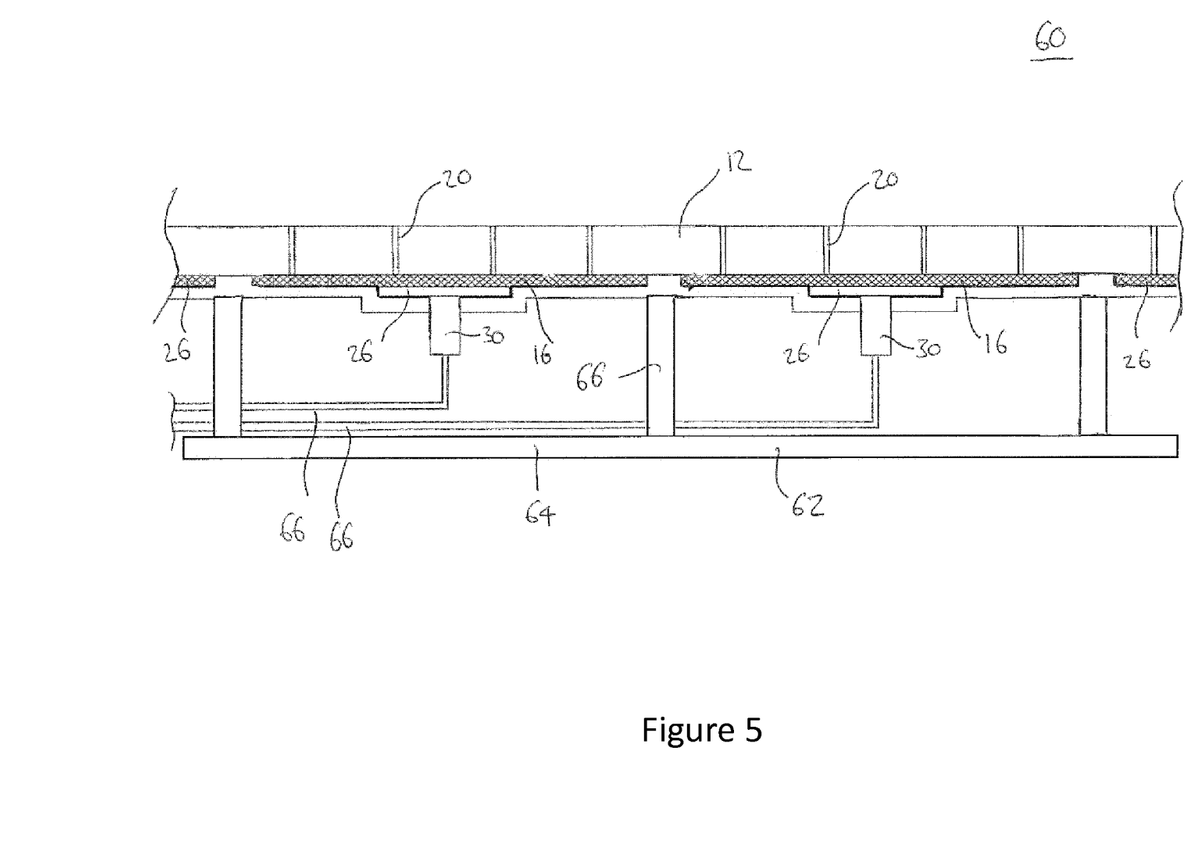
FIG. 5 schematically shows a cross-sectional view of a tool assembly.

FIG. 5 shows a further embodiment of a tool 60. The tool 60 differs from the tool 10 described above in that there are a plurality of discrete support cores 16, and the backing 18 is disposed over the support cores 16 to fluidically isolate the cores from one another. As shown in FIG. 5, the passageways 20 in the skin 12 are aligned with the respective support cores 16, and margin portions of the skin 12 are defined in the spaces between the support cores 16.

There is also a corresponding plurality of barrier layers 24, ports 26 and conduits 30. In this embodiment, each conduit 30 is coupled to a respective fluid line 66, each of which are coupled to a respective control valve (not shown) so that a controller (not shown) can selectively fluidically couple each one of the fluid lines to a low pressure or vacuum apparatus. Accordingly, the controller can be used to select which of a plurality of discrete zones of the layup surface 14, corresponding to the discrete underlying support cores 16 and associated passageways 20, are subject to suction. This may be particularly useful when applying the release sheet 33 in preparation for a layup procedure, as the release sheet 33 can be smoothed and applied over a first zone and subsequently over successive zones as they are fluidically coupled to the low pressure or vacuum apparatus. This may help to avoid imparting wrinkles in the release sheet 33.

The tool 60 further comprises a support structure 62 disposed below the backing 18 and arranged to support the backing 18, support core 16 and skin 12. The support structure 62 comprises a base support 64 and a plurality of support arms 66 extending from the base support 64 to the backing 18. In this embodiment, the support arms 66 are fixed to the backing at locations corresponding to the spaces between discrete support cores 16. This may allow for local direct transmission of structural load through the margin portions of the skin 12 and backing 18 to the support arms 66 (i.e. without loads passing through an intervening support core in that region). In this embodiment the support structure 62 is composed of carbon fibre reinforced composite (CFRP) beams, but in other embodiments may be composed of other materials, such as stainless steel or other composite materials.

The tool 60 is shown in truncated view in FIG. 5 and may include any number of discrete support cores.

Further, in other embodiments the tool 60 may be formed as an assembly of tools 10 assembled on the support structure 62 so that the individual layup surfaces 14 of the tools 10 define a substantially continuous layup surface. Further, such tool assemblies may be assembled to define a mandrel suitable for receiving a pre-form that extends circumferentially around the mandrel to form a unitary body with an internal cavity corresponding to the shape of the mandrel.

Although it is known to apply a low pressure or vacuum through passageways in a tool, such as a vacuum table, such arrangements typically require a plenum chamber or vacuum chamber below the tool, which typically results in a cumbersome and heavy-duty tool. Further, the surfaces of the tool must be sufficiently strong to react the pressure forces applied by the low pressure or vacuum apparatus.

Tools for forming composite components are typically heavy and thereby difficult to manipulate as they are often manufactured from metal to provide a solid layup or forming surface. For the reasons given above, tools of the vacuum table type are particular heavy and cumbersome owing.

The invention provides a lightweight tool manufactured primarily of composite materials (i.e. fibre reinforced plastics). Further the invention obviates the need for a vacuum chamber or plenum chamber by providing a gas-permeable layer below a skin. Since the gas-permeable layer is disposed between the skin and a backing, this allows a supporting arrangement to be defined between the backing and the skin, and so the skin can be relatively thin whilst still reacting the pressure loads applied on the tool in use. The tool can therefore be lightweight and sufficiently strong for a low pressure or vacuum to be applied therethrough during the manufacture of a composite component, for example, during lay-up to hold a release sheet, and during a de-bulking operation.

Using a lightweight tool may provide a number of benefits. In particular, in automated composite layup procedures the tool is often manipulated (e.g. rotated). Heavy tools can present challenges in manipulating the tool, either in terms of the strength of the equipment required, or the speed at which the tool can be manipulated. Further, tools are often moved from station to station within a workshop or manufacturing environment, sometimes manually. It is therefore desirable for the tools to be lightweight.

Although embodiments of the invention have been described with respect to a tool for laying up a pre-form for a composite component, it will be appreciated that in other embodiments the tool may only be used for receiving, and subsequently de-bulking and/or curing a pre-form. A separate tool may be used to layup the pre-form.

Although example uses of a tool have been described in which a flexible vacuum bag or membrane is disposed over the pre-form on the tool for forming, and de-bulking, in other embodiments a re-usable vacuum bag may be used. In particular, a reusable vacuum bag may be provided, and may be coupled to a fibre-reinforced plastic (i.e. composite) frame that can be sealed against the tool. The reusable vacuum bag may be pre-shaped to correspond to the desired profile (or shape) of the component to be manufactured thereby ensuring that a component of the desired shape is formed. Where a composite frame is used, the composite frame may be provided with a seal, such as a silicon seal which can create a gas and vacuum tight seal when pushed down on the layup surface of the tool, or an alternative support surface of the tool. The vacuum bag may be composed of silicon.

The invention claimed is:

1. A tool for manufacturing a composite component, the tool comprising:
   a skin composed of fibre reinforced plastic and defining a layup surface for the composite component, the skin having a plurality of passageways extending from the layup surface to an opposing surface of the skin;
   a backing secured to the skin, the backing and the skin defining a cavity therebetween;
   a support core disposed within the cavity and comprising a gas-permeable material in fluid communication with the passageways; and
   a conduit extending through the backing such that the conduit is in fluid communication with the gas-permeable material.

2. The tool according to claim 1, wherein the support core includes a barrier layer disposed between the gas-permeable material and the backing.

3. The tool according to claim 1, wherein the support core includes a port in fluid communication with the gas-permeable membrane between the gas-permeable membrane and the backing, wherein the port is in fluid communication with the conduit.

4. The tool according to claim 1, wherein the backing is integrally formed with the skin.

5. The tool according to claim 1, wherein at least a portion of the backing is directly coupled to the skin.

6. The tool according to claim 1, wherein there is a plurality of cavities between the skin and the backing, and wherein a plurality of discrete support cores is disposed in the respective cavities.

7. The tool according to claim 5, wherein there is a plurality of cavities between the skin and the backing, and wherein a plurality of discrete support cores is disposed in the respective cavities, and wherein at least a portion of the backing is directly coupled to the skin, and wherein there is a plurality of discrete backings, each backing associated with a respective one of the cavities.

8. The tool according to claim 6, further comprising a controller configured to selectively fluidically couple respective cavities or subsets of cavities to a vacuum apparatus to apply a compression force through the skin and backing.

9. A tool according to claim 1, wherein the shape of the cavity conforms to the shape of the support core.

10. A tool assembly comprising a support structure and one or more tools according to claim 1 mounted to the support structure.

11. The tool assembly according to claim 10 and comprising a controller configured to selectively fluidically couple respective cavities or subsets of cavities of the tool or tools to a vacuum apparatus for the tool assembly to apply a compression force through the skin and backing.

12. The tool assembly according to claim 10 in the form of a mandrel.

13. The tool assembly according to claim 12, wherein the plurality of tools form a substantially continuous layup surface around the mandrel.

14. The tool according to claim 1 or tool assembly according to claim 10, further comprising vacuum bagging apparatus for applying over a pre-form for a composite component.

15. A method of manufacturing a tool for laying up a composite component, the method comprising:
    applying plastic fibre reinforcement material on a master to form a skin of the tool, the skin having a plurality of passageways extending from a layup surface to an opposing surface of the skin;
    applying a support core including a layer of gas-permeable material over the skin;

applying fibre reinforcement material over the support core to form a backing of the tool so that the skin and the backing define a cavity therebetween in which the support core is disposed, the backing comprising a conduit extending therethrough to be in fluid communication with the gas-permeable material; and causing the fibre reinforcement material of at least the backing to cure under compression so that the cavity conforms to the support core.

16. The method according to claim 15, wherein applying the support core includes applying a port over the gas-permeable material for drawing gas through the gas-permeable material, wherein the port is configured for fluid communication with the conduit extending through the backing.

17. The method according to claim 16, wherein the port is integrally formed within the conduit.

18. The method according to claim 15, further comprising curing the fibre reinforcement material forming the skin before curing the fibre reinforcement material of the backing and/or before applying the support core over the skin.

19. The method according to claim 15, further comprising forming a plurality of passageways through the skin to provide fluid communication between the cavity and an opposing surface of the skin;

wherein the passageways through the skin are formed after curing the fibre reinforcement material forming the skin and before curing the fibre reinforcement material of the backing and/or before applying the support core over the skin.

20. The method according to claim 15, further comprising mounting the tool on a support structure to form a tool assembly, wherein the tool assembly is in the form of a mandrel.

* * * * *